United States Patent
Khanna et al.

(10) Patent No.: US 6,324,540 B1
(45) Date of Patent: *Nov. 27, 2001

(54) APPARATUS AND METHOD FOR EFFICIENTLY PARTITIONING A WEIGHTED ARRAY

(75) Inventors: Sanjeev Khanna, Highland Park, NJ (US); Shanmugavelayut Muthukrishnan, New York City, NY (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/028,065

(22) Filed: Feb. 23, 1998

(51) Int. Cl.[7] .................................................. G06F 9/00
(52) U.S. Cl. .................................. 707/102; 707/1; 707/3
(58) Field of Search ............................................ 707/1–206

(56) References Cited

U.S. PATENT DOCUMENTS 5,588,138 * 12/1996 Bai et al. ............................. 395/497

* cited by examiner

Primary Examiner—Thomas Black
Assistant Examiner—John G. Mills
(74) Attorney, Agent, or Firm—William H. Bollman

(57) ABSTRACT

A method and apparatus for determining an approximated solution to the partitioning of a two or greater dimensional array in an amount of time on the order of O(1). Given a desired maximum weight or a maximum number of partitions, an array of data is partitioned by determining a temporary division of the array of blocks such that each block has a weight of at least two times the desired maximum weight. Within each block, rectangles are determined which contain array elements greater than or equal to an arbitrary value corresponding to a guess at a maximum weight. From among these rectangles, a largest set of independent rectangles is determined, and partitions are defined based on the sides of the largest set of independent rectangles determined for each block. Select ones of the partitions may be deleted until a total number of defined partitions is equal to or less than a desired maximum number of partitions.

24 Claims, 1 Drawing Sheet

APPARATUS AND METHOD FOR EFFICIENTLY PARTITIONING A WEIGHTED ARRAY

BACKGROUND OF THE INVENTION

1. Field of the Invention

This invention relates to methods of and apparatus for partitioning an array of items, and more particularly to partitioning an array of n items into p subarrays so that a maximum weight of the array elements within any subarray is minimized.

2. Background of Related Art

Array partitioning problems arise in a number of load balancing, scheduling, data layout, video compression and image processing settings. Although the present invention relates generally to the partitioning of multiple dimension arrays, for simplicity of description partitioning will be described herein with respect to two dimensions only, with the understanding of the applicability to arrays of higher dimensions.

The problem of partitioning a set of items into roughly equal weight subsets is a fundamental one. Consider partitioning an n×n array of items into rows and columns having a number p of intervals there between in both dimensions. The p intervals in both dimensions can be understood as forming blocks of array elements. The present invention relates to and improves upon methods and apparatus for determining those partitions p which minimize a maximum weight given to the array elements in each of the resulting blocks. The 'weight' in this determination may be virtually any characteristic of the array elements particular to the application for which the invention is being utilized. For instance, for purposes of description only, the 'weight' of determined blocks in an n×n array will be defined as the sum of the array elements contained within the partitioned blocks.

The definition of the 'weight' associated with the partitioned blocks in an array, the type of partitions allowed, and the dimensions of the partitioned arrays depends upon the particular application at hand. Particular applications having n×n arrays with weighting based on the sum of the elements contained within the partitioned blocks include load balancing for parallel processing, data partitioning for parallel software, and compilers for high-performance parallel languages. Moreover, partitioning of n×n arrays is particularly applicable for use in the compression of the data required to represent a video signal. Some video compression techniques take advantage of the fact that typically only portions of a video image change from frame to frame based on the motion of an object. In this application, the present invention applies to the determination of motion estimation by matching partitioned blocks between frames of a video image. Here, it is typically desired that given a maximum desired weight $\delta$ of any partitioned block, that the partitions be minimized such that the maximum weight of any partitioned block is at most the desired weight value $\delta$.

The present invention will generally be described with respect to the solution of two types of partitioning:

(a) Given a desired number of partitioned blocks B, partition a given array into at most B blocks having the weight of any partitioned block B minimized; and (b) Given a desired maximum weight $\delta$, partition a given array into a minimum number of blocks B such that the weight of any block B in the partition is no greater than the desired maximum weight $\delta$.

There is a need for equipment such as that implementing parallel processing or image compression to partition multidimensional arrays of data with improved speed, efficiency and accuracy.

Conventional partitioning techniques are extended to two dimensions, e.g., when given a desired number of partitions p, the effort is to find the p×p partitions that minimize the maximum of the weight functions of the individual blocks. This is known as the "two dimensional p×p partition problem". In a related situation extended into the two dimensional case, given a desired maximum value for the weight function $\delta$, find the minimum number of partitions p for which there exists p×p partitions forming blocks each having a weight function no greater than the desired maximum weight $\delta$. This is known generally as the "two dimensional $\delta$-weight partition problem."

Consider AA to be an n×n array. The effort is to divide each column (e.g., AA[1, n]) into p intervals defined by horizontal dividers $(h_0=0)<h_1 \leq h_2 \leq \ldots \leq h_{p-1} \leq (h_p=n)$, and each row (e.g., AA[1,n]) into p other intervals defined by the vertical dividers $(v_0=0)<v_1 \leq v_2 \leq \ldots \leq v_{p-1} \leq (v_p=n)$. This partitioning defines $p^2$ blocks given by $AA[h_{i-1}+1 \ldots h_i, v_{j-1}+1 \ldots v_j]$ for each i, j.

Two weight functions arise commonly in practice: the additive weight function:

$$F(A[i,j]) = \Sigma_{k=i}^{k=j} A[k]$$

and the Hamming weight function $H_c$ for a given parameter c, relative to another array B of size n, given by:

$$H_c(A[i,j]) = \min_{-c \leq k \leq c} H(B[i+k,j+k], A[i,j])$$

where H(X,Y) gives the Hamming distance between two segments X and Y of identical length.

Using either of these or another weight function, the resultant maximum of the weight values is determined by:

$$\max_{i=1}^{i=p} f(A[d_{i-1}+1 \ldots d_i])$$

Conventional weight functions for the partitioned blocks are the additive weight function F or the Hamming weight function $H_c$.

The minimum of the maximum weights of the individual blocks in a partition (MAX norm) is given by:

$$\max_{i=1,j=1}^{i=p,j=p} f(AA[h_{i-1}+1 \ldots h_i, v_{j-1}+1 \ldots v_j])$$

Given a desired number of partitions p, a practical example of a two dimensional p×p partition problem using an additive weight function is now given.

For data stored in two dimensional arrays, several high performance computing languages allow the user to specify a partitioning and distribution of data onto a logical set of processors. An example of such a scheme is what is known as the generalized block distribution in HPF (high performance Fortran), which is a two dimensional p×p partition problem using an additive weight function F.

The two dimensional p×p partition problem using a Hamming weight function is exhibited in motion-compensated video compression by block matching. Since successive frames of a video sequence are strongly correlated, frames can be compressed by reference to the preceding ones. This can be improved by first estimating portions of the current frame which correspond to moving objects and then transmitting motion vectors that indicate to the decoder where to look at the previous frame to predict the current one. The most popular method for estimating the motion vectors is called block matching as discussed in J.

Jain and A. Jain, "Displacement Measurement and its Application in Interframe Coding", IEEE Transactions on Communications, vol. 29, pp. 1799–1808 (1981), which is expressly incorporated herein by reference. This involves tiling the current frame with blocks and estimating the motion vectors for each block individually. The motion vector for a given block is usually obtained by minimizing, from among candidates v within a limited search area, some norm of the difference between the block and the previous frame at v. An example is the minimum Hamming distance between B and v within a window of width C around the position corresponding to B in the previous frame, for some parameter C. The main variation is in how the current frame is tiled. Some extant tilings use fixed-sized blocks as discussed in J. Jain and A. Jain, "Displacement Measurement and its Application in Interframe Coding", IEEE Transactions on Communications, vol. 29, pp. 1799–1808 (1981), superblocks as discussed in B. Carpentieri and J. Storer, "A Split-Merge Parallel Block Matching Algorithm for Video Displacement Estimation", Proc. Of IEEE Data Compression Conference, pp. 239–248 (1992), and quadtrees as discussed in D. Hoang, P. Long and J. Vitter, "Explicit Bit Minimization For Motion-Compensated Video Coding", Proc. Data Compression Conference", (1995); G. Martin, R. Packwood and I. Rhee, "Variable Size Block Matching Motion Estimation With Minimal Error", Proc. IS & T/SPIE Symp. On Electronic Imaging: Science and Technology, (Jan. 1996); and I. Rhee, G. Martin, S. Muthukrishnan, and R. Packwood, "Variable Size Block Matching Motion Estimation Based on Quad Trees With Minimal Error", (submitted 1997), all of which are expressly incorporated herein by reference. Given the desire to determine a p×p partition as discussed herein, the problem then becomes one of computing the best tiling. This is precisely our two dimensional $\delta$-weight partition problem using a Hamming weight function $H_c$. Here, the desired weight $\delta$ is the error threshold set in accordance with the particular application.

See D. Hoang, P. Long and J. Vitter, "Explicit Bit Minimization For Motion-Compensated Video Coding", Proc. Data Compression Conference", (1995); and G. Martin, R. Packwood and I. Rhee, "Variable Size Block Matching Motion Estimation With Minimal Error", Proc. IS & T/SPIE Symp. On Electronic Imaging: Science and Technology, (Jan. 1996) and references therein, or "Block Matching Methods", http://www.ee.princeton.edu/santanu/journal/paper/node3.html, for background on block matching, all of which are expressly incorporated herein by reference.

Whereas a one dimensional array of data can typically be partitioned to an exact optimum solution in a reasonable amount of time, a two dimensional array must be partitioned to an approximation only, to be solved reasonably fast.

A number of methods are known for block matching, e.g., as requiring the solution of a two dimensional $\delta$-weight problem using a Hamming weight function $H_c$. These conventional methods essentially work by splitting subareas greedily until each subarea has a weight of at most the desired maximum weight $\delta$. However, the conventional methods do not provide any guarantees as to the number of partitions (or blocks) required. As disclosed in M. Grigni and F. Manne, "On the Complexity of the Generalized Block Distribution", Proc. Of $_3$rd International Workshop on Parallel Algorithms for Irregularly Structured Problems, Lecture Notes in Computer Science 1117, Springer, pp. 319–326 (1996) (which is expressly incorporated herein by reference), the solution using the conventional methods is considered to be "NP-hard".

For the p×p partition problem using an additive weight function F, Grigni and Manne showed that the two dimensional p×p partition problem is NP-hard even when the given array consists of 0/1 entries. Independently, Charikar et. al have given a simple proof that this problem is APX-hard, that is, the problem is in fact NP-hard to approximate within a factor of two. While a number of natural heuristic algorithms are known for this problem (See for example Grigni and Manne), most of them can be shown to provide poor approximations, e.g., to only about $\Omega(\sqrt{p})$. The currently best known approximating technique provides a performance of only $O(\sqrt{p})$(See M. Hallsorsson and F. Manne, "Manuscript" (1996)). Table II below summarizes the results of various conventional techniques.

| REFERENCE | RESULT |
|---|---|
| Grigni & Manne | NP-Hardness |
| Charikar et al. | APX-Hardness |
| Halldorsson & Manne | $O(\sqrt{p})$ approximation |

There is a need to improve the speed of an approximated solution for an array either given the desired maximum weight of any block or given the desired number of partitions, for a two and greater dimensional array, and/or to strike an improved balance between greater speed and increased accuracy.

SUMMARY OF THE INVENTION

A method and apparatus for partitioning a two-dimensional array of data based on a weight given to any one block in the array is provided. A temporary division of the array into a plurality of blocks is determined such that each of the blocks has a weight of at least approximately two times a desired maximum weight. Within each block, rectangles containing array elements greater than or equal to an arbitrary value are determined. Then, from among these rectangles a largest set of rectangles which are independent is determined for each block, and partitions of the array are defined corresponding to sides of the largest set of rectangles which are independent for each block.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
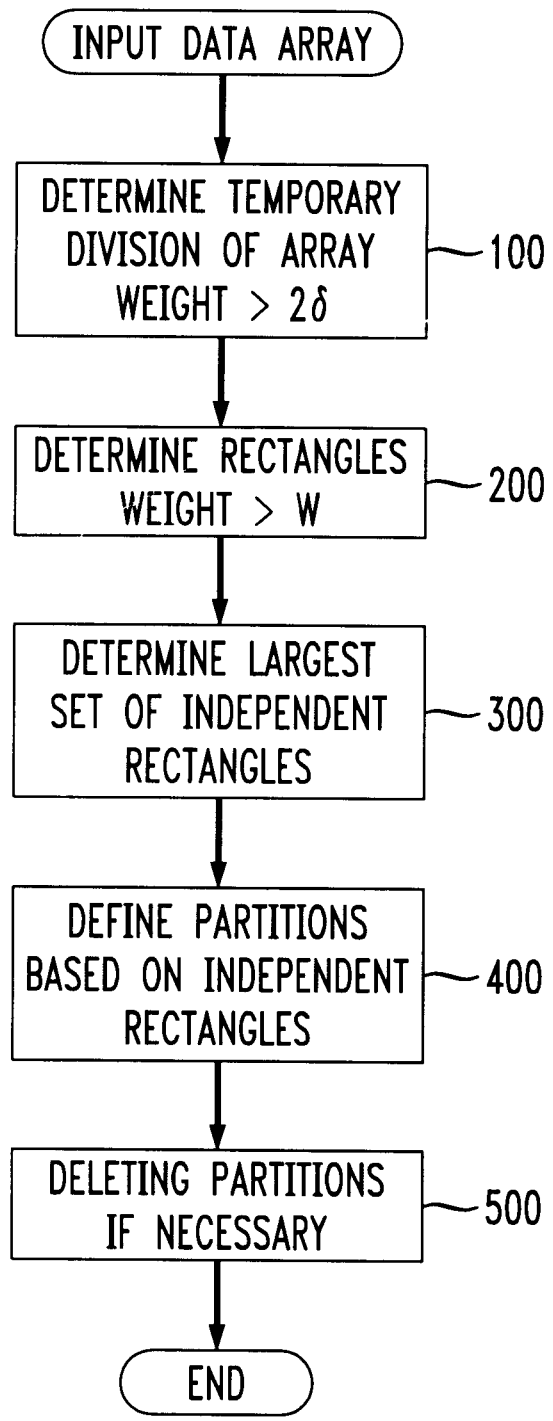
FIG. 1 shows a method for efficiently partitioning a weighted array in accordance with the principles of the present invention.

Given a desired maximum weight value $\delta$ and using the present invention to partition a solution to the two dimensional $\delta$-weight problem, one can easily obtain an $O((\log n)^2)$ approximation to an optimal partitioning using an additive weight function F. However, the present invention provides an increased accuracy of the solution in a shortened amount of time. This improved accuracy is achieved by recognizing an inherent connection and balance between "independent" blocks having greater weight within the array, and the time required to achieve an optimal solution. With suitable pre-processing of the two-dimensional array, a locally optimal collection of independent blocks can be used to generate a solution which is at most a multiple or linear factor away from the optimal solution. Conventional methods require a much longer amount of time relating to the square root of the number of partitions p, i.e., on the order of $O(\sqrt{p})$.

Two Dimensional δ-weight Partitioning Using Hamming Weight Function $H_c$

In geometry, a rectangle is considered to be "stabbed" by a line if the line passes through the interior of the rectangle. Stated as a problem, this is: Given a set of axis-parallel rectangles in the $[1, n] \times [1, n]$ two dimensional integer grid, determine a set R of grid rows and C of grid columns such that each rectangle is stabbed by one of the rows in R or one of the columns in C and furthermore, $S = \max\{|R|, |C|\}$ is minimized.

The present invention provides a polynomial-time O(log n) approximation for solving the stabbing problem. That is, we give a polynomial algorithm that finds a set R of rows and set C of columns which stab the given set of rectangles and $\max\{|R|, |C|\}$ is O(s* log n), where s* is the optimum solution. Our solution reduces the problem to the well-known "set cover" problem.

The "set cover" problem can be stated as: For each (i,j), $1 \leq i,j \leq n$, Sij denotes the set of rectangles that are stabbed by either the grid row i or the grid column j. Let R' denote the given collection of rectangles and S' denote the collection of sets $S_{ij}$, $1 \leq i,j \leq n$. Find C'∈S such that $$\cup\{S_{ij} | S_{ij} \in C'\} = R'$$

Such a C' is a set cover for R'.

Consider a solution $R = \{r_1, r_2, \ldots, (r_{|R|}\}$ of grid rows and $C = \{c_1, c_2, \ldots, C_{|C|}\}$ of grid columns that stab the given set of rectangles. Without loss of generality, let $|R| \leq |C|$. Let $$C' = \{S_{r_1 c_1}, S_{r_2 c_2}, \ldots, S_{r_{|R|} c_{|R|}}, S_{r_{|R|} c_{|R|+1}}, \ldots S_{r_{|R|} c_{|C|}}\}$$

Since each rectangle is stabbed by one of the grid rows in R or the grid columns in C, C' covers each rectangle in R'. Furthermore, $|C'| = |C| = \max\{|R|, |C|\}$.

In the opposite direction, say C' is a set cover for R'. Then there is a set of grid rows and columns of maximum size |C'| that stab the given set of rectangles. We construct these grid rows and columns for the rectangles as follows. Let R be the set of all row indices in C', that is, $$R = \{i | S_{ij} \in C', 1 \leq j \leq n\}$$

Similarly, $C = \{i | S_{ij} \in C', 1 \leq i \leq n\}$. Clearly $\max\{|R|, |C|\} \leq |C'|$. Since each rectangle in R' is in a set $S_{ii}$ for some Sij ∈C', it is hit by either the grid row i or the grid column j; therefore, it is stabbed by the grid rows in R or the grid columns in C.

Combining those two arguments, it follows that the minimum sized set cover gives the optimum solution to the stabbing problem. Standard results on the set cover problem give a polynomial time algorithm with an approximation of O(log max$_{ij}|S_{ij}|$)=O(log n) (since there are at most $n^4$ grid rectangles in any set, and in fact overall). This in turn gives an O(log n) approximation to the stabbing problem.

Theorem 2:

There exists a polynomial time O(log n) factor approximation for the two dimensional δ-weight partition problem using a Hamming weight function $H_c$.

Proof.

This problem is reduced to the stabbing problem as discussed above. Consider the collection of all possibly overlapping minimal rectangles where the additive weight function F value of each rectangle is >δ; rectangles are minimal in the sense that if two rectangles have an additive weight function F value >δ and one is contained in the other, we retain the smaller one. Now the two dimensional δ-weight partition problem is precisely the stabbing problem for which a O(log n) factor approximation exists.

Two Dimensional p×p Partitioning Using Additive Weight Function F

Grigni and Manne [GM96] have shown that the two dimensional p×p partition problem using an additive weight function F is NP-Complete. In this section, we present a polynomial time heuristic which provides a O(1) factor approximation to an optimum two dimensional p×p partitioning.

The following Lemma 3 is important to our arguments.

Lemma 3:

Let c and d be two positive integers, c, d ≤ k. If there exists a k×k partitioning such that MAX norm of the blocks is B using an additive weight function F, then there exists a k/c×k/d partitioning with MAX norm<cdB using the additive weight function F.

Proof.

Consider a k×k partitioning with MAX norm B and take every cth row as well as every dth column. The maximum F value of a block of this k/c×k/d partitioning is at most cdB since each new block contains cd of the previous blocks.

This lemma can be combined with the observation that Theorem 2 holds for two dimensional δ-weight partition problem using an additive weight function F as well, to get the following.

Theorem 3:

There exists a polynomial time O($\log^2$ n)-approximation for the one dimensional p×p partition problem using an additive weight function F.

Proof.

Our approach is geometric. Let B* be the optimal solution to the two dimensional partitioning problem. Consider a collection of all possibly overlapping minimal rectangles where the f value of each rectangle is ≥B; rectangles are minimal in the sense that if two rectangles have f value ≥B and one is contained in the other, we retain the smaller one. If such a set of rectangles have a stabbing, then B*≤B. On the other hand, if there does not exist a stabbing, then B*≥B. Thus it suffices to find the minimum B for which a stabbing exists.

This observation combined with Lemma 3 implies the following: if we solve the stabbing problem with c-approximation for B =1,2,4, ... (with p/c×p/c partitioning) and so on, and return the smallest B where the stabbing is possible, then that value of B is ≥B* and ≤$C^2$B*. (If fewer than p rows or p columns are used, we can always add arbitrary row or column partitions to pad up the numbers). Since Theorem 2 holds using an additive weight function F as well, we may pick c=O(log n). The stabbing problem is then solved O(log((log n)$^2$B*)) times each of which requires constructing the appropriate rectangles (trivially O($n^4$) time) and solving the stabbing problem (trivially O($n^4$ polylog n) time). Since B*≤$n^2$M where M is the maximum value of any array entry, the whole algorithm works in time polynomial in the input size.

The main result is a substantially improved approximation method which computes a solution to within an O(1) factor approximation.

Let a <W,I> partition be a I×I partition such that the MAX norm of the blocks is at most W. We will now show that given an input instance for which a <W,I> partition exists, we can construct in polynomial time a <O(W),I> partition. The basic idea behind our algorithm is the notion of independent rectangles:

Definition 1:

Two axis-parallel rectangles are said to be independent if there projections are disjoint along both the x-axis and the y-axis.

Clearly, no single horizontal or vertical line can stab a pair of independent rectangles. So if an array has a <W,I> partition, then it may contain at most 2I independent rectangles of weight strictly greater than W. As a result, independent rectangles constitute a useful tool in establishing a lower bound on the optimal solution value. The method presented below builds on this idea to construct a partition whose cost is O(W).

An Improved Method

Let W be the optimal solution value. We assume a knowledge of this value in the presentation below—this value will be determined by performing a binary search over the interval $$[0, \Sigma_{i,j} A[i,j]]$$

Observe that $W \geq \max_{ij} A[i,j]$.

A method of solving a two dimensional partitioning problem in accordance with the principles of the present invention is now described with reference to FIG. 1. The goal of this method is given a predetermined number of partitions p, minimize the maximum weight of the elements contained within the partitions.

In FIG. 1, the first step 100 assumes a value for the weight W, e.g., determined empirically by the practitioner. This initial guess is but a starting point. Then, initial partitions are placed, e.g., an I×I partition of the array is obtained, such that each row or column within any block in the partition has a weight of at most 2W.

This can done by performing independent horizontal and vertical scans. During the horizontal scan, we keep a running sum of the weight of each row since the most recent vertical partition and set down the next vertical partition when the weight of any one of the rows exceeds W. Likewise, we set horizontal partitions based on running sums of the weights of columns during the vertical scan. Since each time a new column (row, respectively) is considered, the weight of the rows (columns, respectively) can increase by at most W, it follows that the weight of any row (column, respectively) within any block induced by the vertical and horizontal partitions does not exceed 2W. Henceforth we consider the array with this I×I partition which we refer to as the partition P.

Thus, as a result of this first step, the initial partitions are such that any block has at most two times the desired weight W. or 2W.

In the second step 200, for each block formed in step 100, all possible rectangles having a weight just greater than the desired weight W are determined for each block.

Thus, a set S of all minimal rectangles whose weight exceeds W and which are entirely contained within the blocks induced by the partition from step 100 are built. A rectangle is considered minimal if there does not exist another rectangle properly contained in it with weight larger than W.

This can be done by starting from each location within a block and considering rectangles with their top left corner at that location in turn in the order of increasing sides until all minimal rectangles of weight strictly greater than W are discovered.

In the third step 300, Definition 1 is important, i.e., defining independent rectangles. For each of the rectangles determined for each partitioned block, the maximum number of independent rectangles are determined.

Thus, a local 3-optimal set $M \subseteq S$ of independent rectangles is determined. M is a local 3-optimal set if there does not exist i $\in \{1, 2, 3\}$ independent rectangles in S−M which can be added to M by removing at most (i−1) rectangles from M without violating the independence condition.

Such a set can be easily constructed in polynomial time by repeatedly performing swaps which increase the size of the current independent collection. Each swap takes polynomial time and the procedure terminates in polynomial time since any independent collection can have at most O(n) rectangles.

In the fourth step 400, tentative final partitions are formed on the basis of the maximum number of independent rectangles determined in step 400. For each independent rectangle, the left, right, top and bottom sides are extended through the array in the horizontal or vertical direction to form partitions.

Thus, in more detail another partition is based on M. For each rectangle in M, we set two straddling horizontal and two straddling vertical partitions so as to induce that rectangle. In all, this introduces at most 2M horizontal and 2M vertical partitions. The partition P from step 100 together with this partition induced by rectangles in M is our new partition now.

In the fifth step 500, if two many partitions remain after the performance of step 400, then partitions are removed in the fifth step 500 until only the desired number of partitions remain. For instance, every other partition may be removed in the vertical and horizontal directions and the resulting partitioning tested to determine if it meets the given criteria.

Thus, in more detail, a partition of the input array now remains which uses $h \leq 2M+I$ horizontal lines and $v \leq 2M+I$ vertical lines. To get an I×I partition from this, we simply retain only every $\lceil h/I \rceil$th horizontal line and only every $\lceil v/I \rceil$th vertical line. By Lemma 3, this increases the maximum block weight by at most a factor of $\lceil h/I \uparrow v/I \rceil$.

Resultant Approximation Accuracy

Two properties of the above method must be established: (a) given a choice of weight W for which the input array has a <W, I> partition, the weight of any block in the partition constructed by the above algorithm is O(W), and (b) the smallest value W for which the analysis of the algorithm holds, identified via binary search, is upper bounded by the optimum solution value. We begin by establishing the first property above; the following lemma is central to the analysis here.

Lemma 4:

Let b be a block contained in some block of the partition P constructed in step 100 above. Then if the weight of block b is at least 27W, it can be partitioned into 3 independent rectangles, each with weight strictly exceeding W.

Proof:

Given a block of weight at least 27W, we construct three independent rectangles of weight exceeding W as follows. First we perform a vertical scan, placing a horizontal cut as soon as the weight of the slab seen thus far exceeds 7W; we place two horizontal cuts in all. This gives us three slabs each of weight strictly greater than 7W. Now we perform a horizontal scan from right to left placing the first vertical cut as soon as one of the horizontal slabs exceeds weight W. Without loss of generality assume that it is the top slab. Then the top right block has weight greater than W but does not exceed 3W, and the two lower horizontal slabs to the left of that vertical cut have weight greater than 4W each. Now in a similar manner we place a second vertical cut to obtain two independent blocks of weight exceeding W from these two horizontal slabs. Thus we get three independent rectangles of weight greater than W each.

Lemma 5:

The weight of any block in the partition constructed at the end of step 400 is O(W).

Proof:

We begin by observing the following easily verifiable properties of the solution: (a) each block of the solution is completely contained in some block of the partition P, and (b) given a block b∈M and another block b'∉M, their projections on the x-axis or the y-axis are either completely disjoint or have a perfect overlap.

Now consider a block b in the solution; using the preceding observations, it is readily seen to fall into one of the following categories: (1) the block b belongs to M, or (2) the block b does not belong to M but has a perfect overlap along one of the axes with a block b'∈M, or (3) the block b does not belong to M but has a perfect overlap along the x-axis with a block b'∈M and a perfect overlap along the x-axis with a block b"∈M.

In Case 1, the weight of b is O(W) since the set S as defined in step 200 has the property that any rectangle r in it has weight at most 3W This is because otherwise, we can always remove either a row or a column (of weight at most 2W) from r to obtain a rectangle r' of weight greater than W, contained in r, which violates the minimality of the rectangles in S.

In Cases 2 and 3, each block has weight at most 27W; this follows from an application of Lemma 4. We observe that at most two blocks in M, say b' and b", may not be independent of a block which falls into these two cases. So if b has weight greater than 27W, we can replace b' and b" with at least three independent rectangles which are constructible from b (and are contained in S). But this contradicts the local 3-optimality of the collection M constructed in step 300. Hence b must weigh at most 27W.

Lemma 6:

The number of rectangles in M is 2I for any choice W for which there exists a <W, I> partition of the input array.

Proof:

If M had x rectangles, then each of those rectangles must be stabbed in the optimal solution since the optimal solution value is bounded by W and every rectangle in M has weight strictly greater than W. Stabbing x rectangles requires at least x/2 horizontal or vertical partitions and hence x must be at most 2I.

Lemma 7:

The weight of any block in the final solution returned in step 500 is at most O(W) for any choice W for which there exists a <W,/I> partition of the input array Proof:

Lemma 6 tells us that the number of horizontal and vertical partitions at the end of step 400 is O(I) each. This fact, along with an application of Lemma 3, allows us to conclude that the weight of every resulting block in the I×I partition is O(W).

This completes the proof of the first property of our algorithm that it gives a solution of weight O(W) whenever a <W,I> partition exists. To conclude, we observe that the least value W for which the algorithm either fails to construct the partition P in step 100 or yields a collection M in step 300 with more than 2I rectangles, must exceed the optimum. Thus the binary search procedure works to identify a suitable W.

Theorem 4:

There exists a polynomial time algorithm that computes an O(1)-factor approximation to the two dimensional block partitioning problem.

Although the range of the weight function in the described embodiments of the present invention are not restricted, improved bounds may be obtained if the weight functions are given a restricted range.

While the invention has been described with respect to p×p partitioning a two-dimensional array, it is equally applicable to the partitioning of arrays having higher dimensions, e.g., three, four, or five dimensions. Moreover, although the additive weight function F and the Hamming weight function $H_c$ are described with respect to the disclosed embodiments, the present invention is equally applicable to other weight functions and tilings.

While the invention has been described with reference to the exemplary preferred embodiments thereof, those skilled in the art will be able to make various modifications to the described embodiments of the invention without departing from the true spirit and scope of the invention.

What is claimed is:

1. A computer implemented method of generating a pre-processing data structure configured for ordering array elements of a data array, comprising:

temporarily dividing in memory a two or more-dimensional array of data into a plurality of blocks such that each of said plurality of blocks has a weight of at least approximately two times a desired maximum weight;

determining by said computer, within each of said plurality of blocks, a largest set of independent rectangles containing said array elements greater than or equal to an arbitrary value; and said computer defining partitions of said two or more-dimensional array of data corresponding to sides of said largest set of independent rectangles for each one of said plurality of blocks;

wherein said pre-processing data structure is applied to one of a load balancing, scheduling, data layout, video compression and image processing settings.

2. The method of generating a pre-processing data structure configured for ordering array elements of a data array for a preferred solution in a data processing system according to claim 1, further comprising:

deleting select ones of said defined partitions until a total number of remaining defined partitions is equal to or less than a desired maximum number of partitions.

3. The method of generating a pre-processing data structure configured for ordering array elements of a data array for a preferred solution in a data processing system according to claim 2, wherein:

said defined partitions are deleted in each dimension of said two or more-dimensional array of data so that an equal number of partitions remain in all dimensions of said two or more-dimensional array of data.

4. The method of generating a pre-processing data structure configured for ordering array elements of a data array for a preferred solution in a data processing system according to claim 1, wherein said step of determining a largest set of independent rectangles comprises:

determining only the smallest rectangles having a weight slightly greater than said desired maximum weight.

5. The method of generating a pre-processing data structure configured for ordering array elements of a data array for a preferred solution in a data processing system according to claim 1, wherein said step of determining a largest set of independent rectangles comprises:

determining a maximum number of possible rectangles.

6. The method of generating a pre-processing data structure configured for ordering array elements of a data array for a preferred solution in a data processing system according to claim 1, wherein:

said arbitrary value is approximately equal to said desired maximum weight.

7. The method of generating a pre-processing data structure configured for ordering array elements of a data array for a preferred solution in a data processing system according to claim 1, wherein:

said two or more-dimensional array of data is partitioned based on a predetermined maximum weight given to any one of said plurality of blocks in said two or more-dimensional array of data.

8. The method of generating a pre-processing data structure configured for ordering array elements of a data array for a preferred solution in a data processing system according to claim 1, wherein:

said two or more-dimensional array of data is partitioned such that a maximum weight given to any one of said plurality of blocks in said two or more-dimensional array of data is minimized.

9. A computing apparatus for generating a pre-processing data structure configured for ordering array elements of a data array, comprising:

temporary division means for determining a temporary division of a two or more-dimensional array in memory of data into a plurality of blocks such that each of said plurality of blocks has a weight of at least approximately two times a desired maximum weight;

rectangle determining computing means for determining, within each block, rectangles containing array elements greater than or equal to an arbitrary value;

independent rectangle computing determining means for determining for each block, from among said rectangles determined by said means for determining, a largest set of rectangles which are independent; and partition definition computing means for defining partitions of said two or more-dimensional array of data corresponding to sides of said largest set of rectangles which are independent for each blocks;

wherein said pre-processing data structure is applied to one of a load balancing, scheduling, data layout, video compression and image processing settings.

10. The apparatus for generating a pre-processing data structure configured for ordering array elements of a data array for a preferred solution in a data processing system according to claim 9, wherein:

said partition definition means is adapted to delete select ones of said defined partitions at least until a total number of defined partitions is equal to or less than a desired maximum number of partitions.

11. The apparatus for generating a pre-processing data structure configured for ordering array elements of a data array for a preferred solution in a data processing system according to claim 10, wherein:

said partition definition means is adapted to delete partitions in each dimension of said two or more-dimensional array of data so that an equal number of partitions remain in all dimensions of said two or more-dimensional array of data.

12. The apparatus for generating a pre-processing data structure configured for ordering array elements of a data array for a preferred solution in a data processing system according to claim 9, wherein:

said rectangle determining means is adapted to determine only the smallest rectangles having a weight slightly greater than said desired maximum weight.

13. The apparatus for generating a pre-processing data structure configured for ordering array elements of a data array for a preferred solution in a data processing system according to claim 9, wherein:

said rectangle determining means is adapted to determine a maximum number of possible rectangles.

14. The apparatus for generating a pre-processing data structure configured for ordering array elements of a data array for a preferred solution in a data processing system according to claim 9, wherein:

said rectangle determining means is adapted to determine rectangles containing array elements greater than or equal to said desired maximum weight.

15. The apparatus for generating a pre-processing data structure configured for ordering array elements of a data array for a preferred solution in a data processing system according to claim 9, wherein:

said partition definition means is adapted to partition said two or more-dimensional array of data based on a predetermined maximum weight given to any one of said plurality of blocks in said two or more-dimensional array of data.

16. The apparatus for generating a pre-processing data structure configured for ordering array elements of a data array for a preferred solution in a by a data processing system according to claim 9, wherein:

said partition definition means is adapted to partition said two or more-dimensional array of data such that a maximum weight given to any one of said plurality of blocks in said two or more-dimensional array of data is minimized.

17. A computer readable storage medium having stored thereon a computer program for implementing a method of partitioning a two or more-dimensional array of data based on a weight given to any one block in said two or more-dimensional array, said computer program comprising a set of instructions for:

temporarily dividing said two or more-dimensional array into a plurality of blocks such that each of said plurality of blocks has a weight of at least approximately two times a desired maximum weight;

determining, within each block, a largest set of independent rectangles containing array elements greater than or equal to an arbitrary value; and defining partitions of said two or more-dimensional array corresponding to sides of said largest set of independent rectangles for each block.

18. The computer readable storage medium according to claim 17, wherein said computer program further comprising a set of instructions for:

deleting select ones of said defined partitions until a total number of said defined partitions is equal to or less than a desired maximum number of partitions.

19. The computer readable storage medium according to claim 18, wherein said set of instructions for deleting select ones of said defined partitions comprises a set of instructions for:

deleting said partitions in each dimension of said two or more-dimensional array of data so that an equal number of partitions remain in all dimensions of said two or more-dimensional array of data.

20. The computer readable storage medium according to claim 19, wherein said set of instructions for determining said largest set of independent rectangles comprises a set of instructions for:

determining only the smallest rectangles having a weight slightly greater than said desired maximum weight.

21. The computer readable storage medium according to claim 19, wherein said set of instructions for determining said largest set of independent rectangles comprises a set of instructions for:

determining a maximum number of possible rectangles.

22. The computer readable storage medium according to claim 19, wherein:

said arbitrary value is approximately equal to said desired maximum weight.

23. The computer readable storage medium according to claim 17, wherein said computer program further comprises a set of instructions for:

partitioning said two or more-dimensional array based on a predetermined maximum weight given to any one of said plurality of blocks.

24. The computer readable storage medium according to claim 17, wherein said computer program further comprises a set of instructions for:

partitioning said two or more-dimensional array such that a maximum weight given to any one of said plurality of blocks.

* * * * *